United States Patent [19]

Eichweber

[11] Patent Number: 5,123,737
[45] Date of Patent: Jun. 23, 1992

[54] DEVICE FOR DETERMINING THE DEVIATION OF A TARGET FROM A PREDETERMINED LOCATION

[75] Inventor: Kurt Eichweber, Hamburg, Fed. Rep. of Germany

[73] Assignee: Precitronic Gesellschaft fur Feinmechanik und Electronic mbH, Hamburg, Fed. Rep. of Germany

[21] Appl. No.: 608,909

[22] Filed: Nov. 5, 1990

[30] Foreign Application Priority Data

Nov. 27, 1989 [EP] European Pat. Off. ........ 89121852.1

[51] Int. Cl.⁵ .......................... G01B 11/26; F41G 1/32
[52] U.S. Cl. ..................................... 356/152; 89/41.06
[58] Field of Search ................ 356/141, 152; 89/41.06

[56] References Cited

U.S. PATENT DOCUMENTS 3,888,362 6/1975 Fletcher et al. .

FOREIGN PATENT DOCUMENTS

| | | |
|---|---|---|
| 0218178 | 4/1987 | European Pat. Off. . |
| 0246354 | 11/1987 | European Pat. Off. . |
| 0253017 | 1/1988 | European Pat. Off. . |
| 1811540 | 8/1970 | Fed. Rep. of Germany . |
| 2850743 | 5/1980 | Fed. Rep. of Germany . |
| 2293714 | 2/1976 | France . |
| 8501787 | 4/1989 | France . |
| 1180778 | 2/1970 | United Kingdom . |

Primary Examiner—Stephen C. Buczinski
Attorney, Agent, or Firm—Hayes & Reinsmith

[57] ABSTRACT

A device for determining the deviation of a target provided with a retroreflector from a predetermined location in three spatial directions has a laser and a quadrant detector arranged next to it, which can be displaced jointly in the three spatial directions X, Y, Z. In this arrangement, the Z-setting is readjusted with the aid of a range measurement, so that the target is optimally illuminated. On the basis of the signal in the quadrant detector a displacement in the X-direction and Y-direction is effected in order to obtain a zero signal from the quadrant detector. The readjustments in the three directions are a measure of the deviation which can be displayed on a display via control electronics.

12 Claims, 2 Drawing Sheets

DEVICE FOR DETERMINING THE DEVIATION OF A TARGET FROM A PREDETERMINED LOCATION

The invention relates to a device for determining the deviation of a target provided with a retroreflector from a predetermined location in three spatial directions, which has:
- a laser and a position-sensitive detector arranged next to it, which are arranged in a common element,
- optical imaging devices for directing the laser beam onto the retroreflector and for imaging the reflected light onto the position-sensitive detector and,
- a laser range measuring device.

As an example, but not exclusively, the device can be used for the purposes of firing simulation. In general, the device can be used for purposes in the case of which a direction and a range of a target are set by other means, and it is then to be checked how accurately the target has been set. For example, in this way the device could serve surveying purposes.

The starting point in a known device of the type named in the preamble of the new main claim (DE-A-3,404,496) is that the beams falling onto the retro-reflector and the reflected beams are parallel, the offset of these two beams being greater the less centrally the retroreflector is hit by the impinging beam. The offset zero then holds as the control criterion. The measuring station with laser and position-sensitive receivers can be swivelled about two axes H and V. Given appropriately long beam paths, even a very small swivelling signifies a very large lateral offset of the beam. It must therefore be ensured by means of complicated mechanical devices that even extremely small swivellings can be carried out. The device will therefore also be very sensitive to disturbances, which can perhaps be accepted in the of alignment with centimeter accuracy in tunnels or the like, but not, for example, in the case of combat exercises with firing simulation or in other cases where the devices are handled relatively roughly.

By contrast, it is the object of the invention to create a device with which the deviation of the set target location from the actual target location can be measured simply and reliably.

The abovementioned previously known device operates with a position-sensitive detector, which is composed of four individual detectors. However, in this regard it is not a matter of what is normally designated as a quadrant detector such as is known, for example, from DE-A-2,850,743. In this previously known device, it is not light reflected from a retroreflector that is measured but scattered light. It is necessary once again to set two angles accurately with respect to one another, by setting the laser and telescope axes parallel. Thus, once again a swivelling movement takes place with the required high accuracy and there is the need to carry out the smallest swivelling movements exactly.

In the case of a device known from DE-A-1,811,540 it is, once again, possible only to rotate and swivel. Thus, once again only the angle is varied. It is also important in the case of the last mentioned device that the incoming and outgoing beams have the same finite spacing from one another, because of the finite magnitude of the prism 3. This geometry does not, of course, occur if the triple mirror is very far removed from the laser.

The abovementioned object is achieved when the common element is arranged for common displacement in the three spatial directions and when circuits are provided for tracking the common element in the laser beam direction to a position which corresponds to the measured range, and in the directions perpendicular thereto to a position for which the position-sensitive detector transmits a zero signal, it being possible to compute and display the deviation from the magnitude of the tracking.

As has been said, only swivelling movements take place in the of all three abovementioned devices. By contrast, in the case of the device according to the invention a linear displacement takes place in the three mutually perpendicular spatial directions, as a result of which not only can the reflected light beam be accurately set to the zero position of the position-sensitive receiver, but, in addition, due to the movement in the Z-direction there is also a sharp setting, something which is not to be gathered from the patents cited.

When the target is set, for example in the case of firing simulation, the device is correspondingly aligned, i.e. the common element is set in the laser beam direction in accordance with the set range, so that the laser beam is optimally focused onto the target by the optical imaging device (usually a lens or a lens system). The common element is likewise correspondingly aligned in the directions perpendicular thereto.

If, now, the deviation is to be determined, the laser is switched on by, for example, squeezing a trigger, in particular the trigger of a firing simulator. In this case, the laser signal is sent to the target, where it is reflected back from the retroreflector and reaches the laser range measuring device via a beam splitter, on the one hand. If the set range does not coincide with the range determined in this way by a travel-time measurement, a readjustment of the common element and thus of the laser and the quadrant detector takes place in the Z-direction, i.e. in the laser beam direction, so that the light spot has an optimum magnitude at the location of the target. On the other hand, the reflected laser light impinges on the quadrant detector. If, in this case, it does not fall precisely on the intersection of the four quadrants, the quadrant detector transmits signals, which are used for the purpose of displacing the common element in such a way that the light spot falls precisely on the center of the quadrant detector which then transmits its zero signal. The displacement in the Z-direction for setting the range, and the necessary displacements in the directions perpendicular thereto (X-direction and Y-direction), for the purpose of maintaining the zero signal of the quadrant detector, are a measure of the deviation, which can be displayed on a display after appropriate conversion.

Reference was made above to a travel-time rangefinder because it is especially expedient; however, it is also possible to use other method of range measurement.

Again, the beam splitter before the quadrant detector is certainly particularly advantageous; however, with other types of range measurement such a splitter could be dispensed with.

It is expedient for the optical channels for the emitted laser beam and the reflected received light to be shielded from one another so that stray light cannot reach the quadrant detector directly from the laser, which would reduce the sensitivity.

It is expedient for the two channels to be arranged next to one another. However, they can also be arranged concentrically by arranging concentrically around the lens that emits the laser light an annular lens which concentrates the reflected light behind the laser onto the quadrant detector.

It is expedient for the device additionally to have a halogen search light, which in the case of a particularly advantageous embodiment has an IR filter with a swivel device. The halogen search light and/or the IR filter can then likewise be switched on by means of the trigger or a pretrigger. It is expedient for the device further to have a television camera, for which, for example, the halogen search light can be used as an illuminating system, if other light sources are not available.

It is expedient for the television camera to be a matrix-CCD camera, since then the received signals can be evaluated particularly well.

In the case of firing simulation, both the television picture of the television camera and the display device for hit position and range can be made visible not only to the trainee but also, in particular, to an instructor, who is able, in this way, to shape and monitor the training in a particularly effective fashion.

The invention is described below on the basis of advantageous embodiments with reference to the attached drawings, wherein.

Figure 1:
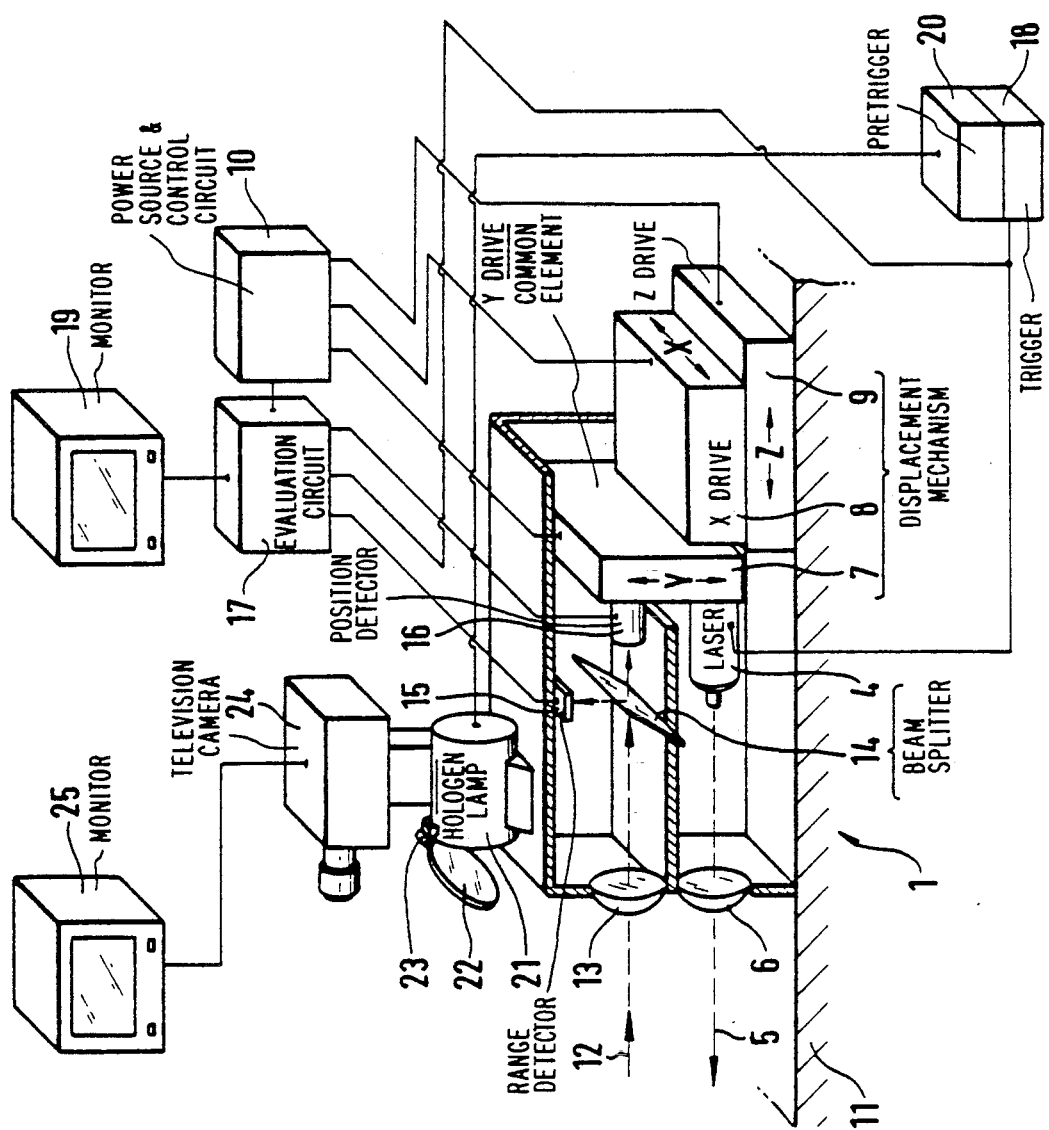
FIG. 1 shows a perspective view partly in section of an embodiment of the device according to the invention.
Figure 1:
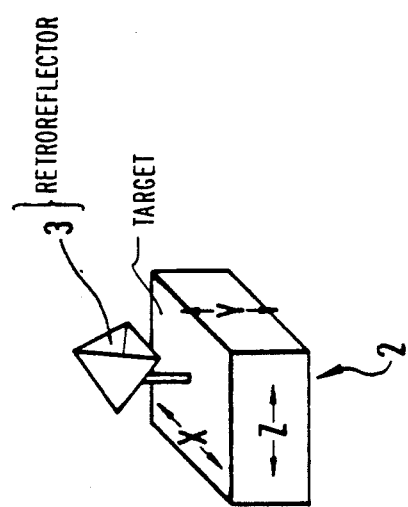

In the Figures, 1 indicates in general a device with which the deviation of a target 2 can be determined. The target is provided with a retroreflector 3, and can be displaced in the X, Y and Z-directions, as is indicated by the corresponding arrows in FIG. 1.

The device 1 has a laser 4, whose emitted light 5 is focused by a lens 6. The laser 4 is fastened to an element 7, which is a part of a displacement mechanism that consists of the elements 7, 8 and 9.

The element 9 can be moved on a support 11 in the Z-direction, i.e. in the laser beam direction, by means of drive devices (schematically shown) via and an energy or power source and control circuit 10. Arranged on the element 9 is an element 8, which can likewise be moved with the aid of the power source and control circuit 10, to be precise relative to the element 9 and in the X-direction, i.e. the horizontal direction. The element 7, in turn, can be moved correspondingly in the vertical Y-direction relative to the element 8.

The light 12 reflected from the retroreflector 3 35 is focused by a lens 13 and is, on the one hand, projected via a beam splitter in the form of a semitransparent plate 14, onto a detector 15 which serves the purpose of travel-time range measurement. On the other hand, the light falls on a quadrant detector 16, which is likewise fastened on the element 7 next to the laser 4. The detector 15 and the quadrant detector 16 are connected to an evaluation circuit 17, which, for the purpose of displacement, is connected in turn to the power source and control circuit 10.

The device operates as follows.

After, for example, in firing simulation, the device has been aimed at the target, a trigger 18 by which the laser 4 is switched on is operated. The light 12 reflected from the target 2 or retroreflector 3 falls on the detector 15. The range of the target is then determined by a travel-time measurement with the aid of the unit 17. If the position of the laser 4 in the Z-direction does not correspond to the optimum angle of illumination at the target location, a readjustment takes place in the Z-direction.

Figure 2:
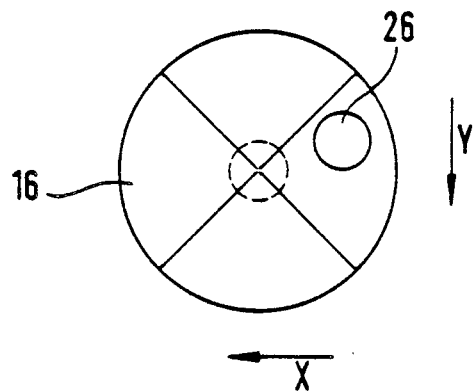
FIG. 2 shows a top view of the quadrant detector which can be used in the invention.

On the other hand, the reflected light spot falls on the quadrant detector 16, as, is indicated at 26 in FIG. 2. Since the light spot 26 is not located at the center, a readjustment in the Y-direction and X-direction takes place until the light spot is located at the center of the quadrant detector, as is indicated by a dashed line. The displacements in the Y-direction and the X-direction likewise take place in this process via the electronic of evaluation circuit 17 and the control circuit and power unit 10.

If the correct positions have been set in the three directions, the deviation can be determined in the unit 17 from the readjustment carried out, and displayed in a monitor unit 19.

As is shown in FIG. 1, it is also further possible to provide at the trigger 18 a pretrigger 20 by means of which it is possible for a halogen lamp 21 to be switched on or, if the halogen lamp had already been previously switched on, for an IR filter 22 to be swivelled away from the lamp 21 with the aid of a swivelling mechanism 23, so that the light reaches the target. The target surroundings can then be imaged by means of a television camera 24, in particular a matrix-CCD camera, and displayed on a monitor 25.

Figure 3:
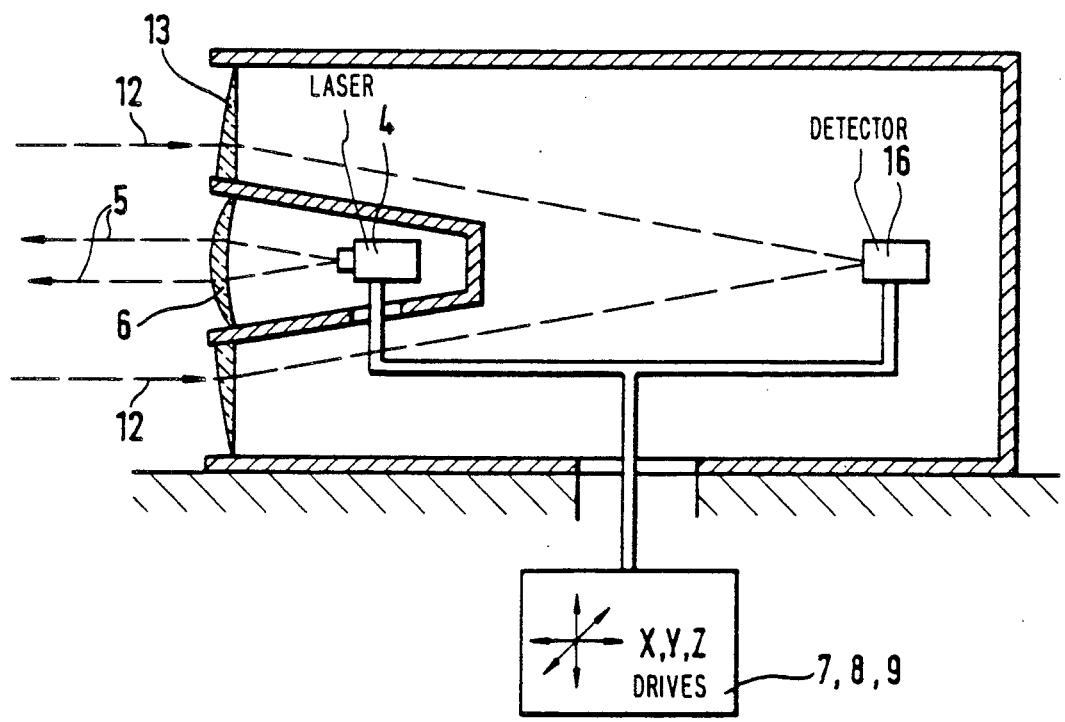
FIG. 3 shows another type of the optical elements of the device.

In FIG. 3, the channels for emitted laser light and received reflected light are not arranged next to one another as in the embodiment of FIG. 1, but are arranged concentrically with respect to one anotehr. For this purpose, the lens 13 is arranged as an annular lens concentrically around the lens 6. In this arrangement, the lens 13 has a longer focal length, so that the light is focused behind the laser 4 onto the detector 16. The laser 4 and detector 16 are, once again, jointly readjusted in the three spatial directions by an adjusting device 7, 8, 9.

I claim:

1. A device for measuring deviation from a predetermined location in three spatial directions of a target provided with a retroreflector, the device comprising a laser, a position-sensitive detector adjacent the laser, a common element within which the laser and detector are arranged, optical imaging devices for directing a beam from the laser onto the retroreflector and for imaging reflected light onto the position-sensitive detector, and a laser range measuring device, the common element being arranged for common linear displacement in said three spatial directions, the common element having a power source and control means for tracking the common element in a laser beam direction to a position which corresponds to a measured range as determined by the laser range measuring device and in directions perpendicular thereto a position for which the position-sensitive detector transmits a zero signal.

2. The device as claimed in claim 1, wherein the position-sensitive detector is a quadrant detector.

3. The device as claimed in claim 1, wherein the laser range measuring device is a traveltime range-finder.

4. The device as claimed in claim 2, including a beam splitter positioned between the retroreflector and the quadrant detector.

5. The device as claimed in one of claims 1 to 4, wherein optical channels are provided for the emitted laser beam and the reflected received light and are shielded from one another.

6. The device as claimed in one of claims 1 to 4, wherein optical channels are provided for the emitted laser beam and the reflected received light and are arranged next to one another.

7. The device as claimed in one of claims 1 to 4, wherein optical channels are provided for the emitted laser beam and the reflected received light and are arranged concentrically.

8. The device as claimed in claim 1, further including a halogen search light directed to the target.

9. The device as claimed in claim 8, wherein the halogen search light has an IR-filter with a swivel device.

10. The device as claimed in claim 1, further including a television camera for imaging the target.

11. The device as claimed in claim 10, wherein the television camera is a matrix-CCD camera.

12. The device as claimed in one of claims 1 to 4 or 8 to 11 further including a display device for hit position and range for purposes of firing simulation.

* * * * *

UNITED STATES PATENT AND TRADEMARK OFFICE
CERTIFICATE OF CORRECTION

PATENT NO.  : 5,123,737
DATED       : June 23, 1992
INVENTOR(S) : Kurt Eichweber It is certified that error appears in the above-indentified patent and that said Letters Patent is hereby corrected as shown below:

Column 3, line 54 "335" should be --3--.

Signed and Sealed this

Twenty-eighth Day of September, 1993

Attest:

BRUCE LEHMAN

Attesting Officer    Commissioner of Patents and Trademarks